Dec. 16, 1958  J. S. HEISLER ET AL  2,864,128
APPARATUS FOR MOLDING INLET AND OUTLET FLANGES FROM
POWDERED POLYETHYLENE AND SIMILAR THERMOPLASTIC
MATERIALS WITH SIMULTANEOUS PRODUCTION
OF MOLDED THREADS THEREON
Filed Aug. 21, 1953  2 Sheets-Sheet 1
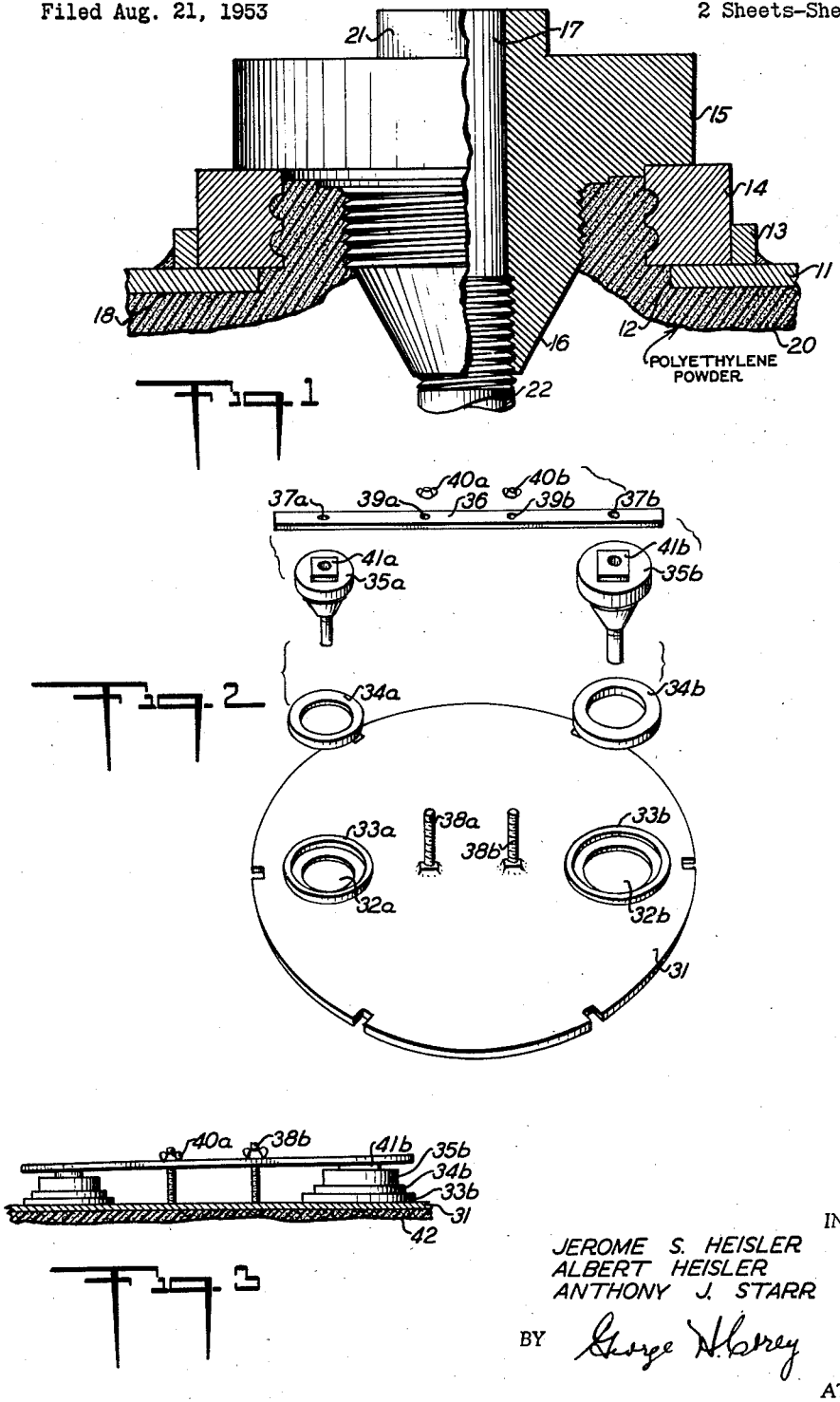
INVENTORS
JEROME S. HEISLER
ALBERT HEISLER
ANTHONY J. STARR
BY George H. Carey
ATTORNEY Dec. 16, 1958   J. S. HEISLER ET AL   2,864,128
APPARATUS FOR MOLDING INLET AND OUTLET FLANGES FROM
POWDERED POLYETHYLENE AND SIMILAR THERMOPLASTIC
MATERIALS WITH SIMULTANEOUS PRODUCTION
OF MOLDED THREADS THEREON
Filed Aug. 21, 1953                                       2 Sheets-Sheet 2
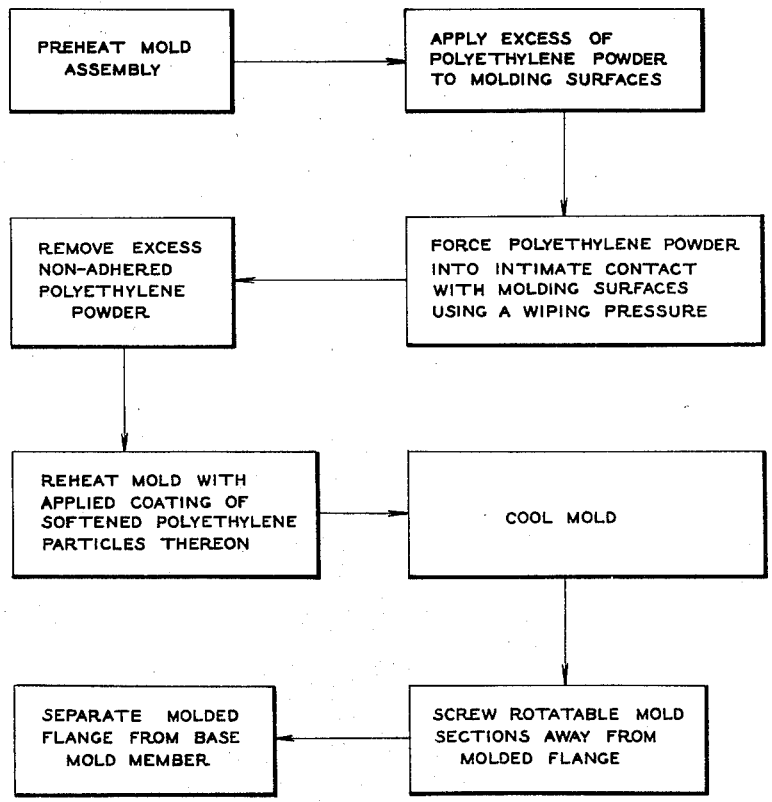
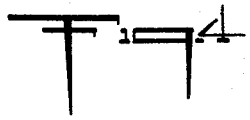
INVENTORS
JEROME S HEISLER
ALBERT HEISLER
ANTHONY J. STARR
BY  George H. Corey
                                        ATTORNEY

2,864,128

APPARATUS FOR MOLDING INLET AND OUTLET FLANGES FROM POWDERED POLYETHYLENE AND SIMILAR THERMOPLASTIC MATERIALS WITH SIMULTANEOUS PRODUCTION OF MOLDED THREADS THEREON

Jerome S. Heisler, Albert Heisler, and Anthony J. Starr, Wilmington, Del., assignors, by mesne assignments, to Jerome S. Heisler and Albert Heisler, both of Wilmington, Del.

Application August 21, 1953, Serial No. 375,625

6 Claims. (Cl. 18—42)

This invention relates to an apparatus for molding inlet and outlet flanges for containers from powdered polyethylene and similar thermoplastic materials with the simultaneous production of molded threads thereon.

Polyethylene possesses a number of desirable properties which commend it for use as a material of construction in the manufacture of containers and the like for the transportation and storage of various materials, particularly valuable fluids and chemicals which are corrosive or easily contaminated if brought into contact with a metal surface. Polyethylene has a relatively low density, is chemically inert, and in sheet or strip form is flexible, strong, practically unbreakable and possesses high tear resistance. Moreover, since polyethylene is thermoplastic it lends itself to fabrication into various shapes by procedures involving the application of heat.

Because of these and other desirable physical and chemical properties, polyethylene containers are becoming widely used in industry and commerce. As in the case of conventional containers such as steel drums and the like, polyethylene containers are usually provided with one or more openings for use in filling and emptying the container. These openings are defined by flanges cooperating with suitable closures, preferably of the screw threaded type. Satisfactory fabrication techniques have been developed for the blow molding of relatively small polyethylene containers such as bottles. Polyethylene carboys having a capacity of about 14 gals. have also been made by a combination of injection and blow molding employing large, complicated and expensive molding equipment. However, polyethylene carboys made by this technique have the disadvantage that they contain only a centrally located pouring and filling opening usually defined by an externally threaded flange.

Our invention in its broader aspects is based on our discovery that it is possible to produce by powder molding of polyethylene and similar thermoplastic materials articles of relatively thick and varying cross section, and, more particularly, to produce flanges for container pouring openings with the simultaneous production of molded threads thereon, either on the external or the internal surface alone or simultaneously on the external and internal surfaces of the flange. Prior to our invention, so far as we are aware, no method and apparatus for use in molding flanges for container inlet and outlet openings with the simultaneous production of molded external and internal threads thereon have been available.

It is an object of this invention to provide an apparatus for the powder molding of flanges for pouring openings for containers from polyethylene and similar thermoplastic materials brought to the molding operation in the powdered or comminuted state with simultaneous production of threads thereon.

It is a further object of this invention to provide an apparatus for molding polyethylene flanges for pouring openings for containers with the simultaneous production of molded external and internal threads thereon.

It is another object of this invention to provide an apparatus for use in molding polyethylene for pouring openings with the simultaneous production of molded threads thereon, which method is relatively inexpensive to operate and the apparatus takes a simple form.

Still another object of this invention is to provide a new and improved apparatus for molding polyethylene flanges for container pouring openings which method and apparatus lend themselves to large scale or mass production operations in the manufacture of molded polyethylene outlet flanges having a wide variety of sizes and shapes.

These and other objects of this invention and how they are accomplished will become apparent with reference to the accompanying disclosure and drawing, wherein:

Fig. 1 is a vertical cross sectional view of a mold assembly according to the present invention showing a polyethylene outlet or inlet in process of being molded by the method of the present invention;

Fig. 2 is an exploded perspective view of a mold assembly for use in molding the cover of a polyethylene container simultaneously with the molding and integral joining thereto of a pair of flanges having external and internal threads thereon;

Fig. 3 is a vertical partly cross sectional view of the mold assembly illustrated in Fig. 2 with the parts thereof in assembled relationship.

Fig. 4 illustrates the preferred method for use of the improved apparatus.

The present invention in its broader aspects is based on our discovery that it is possible to build up dense, liquid impervious homogeneous coatings of polyethylene on metal surfaces by the use of polyethylene in powder form applied to such surfaces under suitably controlled conditions as to preheat of the metal surface and the application of the polyethylene powder to the heated metal surface as more fully brought out hereinafter. This broad concept as applied to the application of coatings or liners directly upon the inner walls of containers or other metal surfaces is disclosed in our copending application Serial No. 185,254, filed September 16, 1950, and on which Patent No. 2,737,461 issued March 6, 1956. We have found that this procedure may be extended to the production of self-sustaining containers, usable either as such or as removable liners for metal drums or with suitable overpacks of metal, plywood, fiber-board or other acceptable material. A method of molding such polyethylene containers and representative products produced thereby is disclosed in our copending application Ser. No. 360,214, filed June 8, 1953, and on which Patent No. 2,736,925 issued March 6, 1956. As more particularly disclosed in Patent No. 2,736,925, our novel method of powder molding involves the use of molds of suitable shape, composition and heat capacity, which are first preheated to a controlled degree, whereupon polyethylene powder in a suitable state of subdivision is applied to the preheated mold walls and forced into intimate contact therewith, preferably with a wiping pressure, this operation being continued until the desired wall thickness has been developed or until no more of the polyethylene particles will become softened and adhered to the previously deposited layer. In applying the powder to the mold surfaces, or to a previously built up coating, an excess of the polyethylene powder is provided so that the application of force to bring the particles into intimate contact with and promote their adherence to the mold surfaces and their sintering or incipient fusion into a cohesive layer, is effected through the intermediary of a layer of the as yet unsoftened or unsintered particles, thus minimizing the tendency for softened particles to stick to the force-applying means and also serve as an insulating blanket which acts to conserve the heat stored in the mold so that it will be utilized in softening or fusing the adhered particles. The excess powder also acts beneficially in preventing free access of air to the particles that are in process of becoming fused or coalesced into the deposited layer. As more particularly brought out in our above mentioned copending applications, if a coating of the desired thickness is not built up while the mold is cooling down from the predetermined preheated state, the mold is then reheated after removing the excess, non-adhered, polyethylene powder, and then a further application of the powder is made under similar conditions as before. These operations may be further repeated if desired. After the final coating step the mold is returned to the oven and heated to complete the baking and solidifying of the applied coating, whereupon the mold is cooled and thereafter the molded polyethylene shape is removed from the mold.

According to the process of powder molding polyethylene containers as disclosed in our Patent No. 2,736,925, the bottom and side walls of the complete container are produced by using a mold of appropriate heat-storing capacity having inner wall surfaces conforming to the external dimensions of the desired container. The cover portion is separately molded with the use of a cover mold formed to the shape of the cover and provided either with supplemental mold sections for simultaneously molding the flanges as a part of the cover or with means defining openings in the cover into which separately formed flange elements may be inserted and welded into the mold cover portion of the polyethylene container at an appropriate stage in the process. When the cover section and the bottom and side wall section have been built up to the desired thickness on their respective molds, the cover mold section is then secured over the open end of the bottom and side wall section with peripheral portions of the molded polyethylene shape brought into closely fitting engagement with the polyethylene layer disposed on the side wall mold section. After drawing the complementary mold sections tightly together, the assembly is heated to a temperature sufficient to bring about fusion or welding together of the molded polyethylene sections where they are in contact within the mold assembly, thereby establishing a water tight joint between the periphery of the cover portion and the side walls.

If the flanges have not been molded into the cover section as a part of the cover molding operation, suitable pre-formed flanges are inserted in the openings provided therefor at the time the cover mold is secured to the bottom and side wall mold and before the final heating and welding operation. The preformed flanges are secured in appropriate fitting relation to the molded polyethylene cover layer so that in the subsequent heating step welding will take place between the peripheral areas of the pre-formed flange and the adjacent contacting portions of the molded polyethylene cover section of the container. In this way, it is insured that the flanges are welded in place simultaneously with the welding of the cover section to the adjacent end of the side wall section.

The present invention is directed more particularly to the powder molding of the flanges either in a separate operation or simultaneously with the molding of the cover section of a container of which such flanges are intended to become an integral part. The invention includes as one of its features and as an improvement over the provisions for molding of the outlet and inlet flanges disclosed in our Patent No. 2,736,925, an improved flange mold which provides for simultaneous molding of glass threads on the external periphery of the flange and of conventional pipe threads on the inner wall of the flange. The mold of the present invention has also been designed to insure a much greater heat capacity in the mold sections surrounding the flange along with features which make for simplification of the assembly and disassembly of the mold and thus making possible the further marked speeding up of molding operations carried on therewith.

Referring now to the drawing, and to Fig. 1 in particular, there is illustrated a mold assembly suitable for use in molding polyethylene flanges with the simultaneous production of molded external and internal threads thereon in accordance with this invention. The mold includes a base section 11 shown broken away at the margins and provided with an opening 12 therethrough. This section may take the form of a cover or lid mold of a closed-ended container, or may be of appropriate smaller diameter such as may be desired when the flanges are being molded separately from the container cover section. On one side of the mold body is a retaining ring 13 which is welded or otherwise secured to the mold body 11 and which has an inside diameter somewhat greater than the diameter of the opening 12. Positioned within the retaining ring 13 and seated on the mold body 11 is an internally threaded mold ring 14. As shown, the mold ring 14 is internally threaded with standard glass threads of the type provided on the outlets of glass containers and the like. Seated against the outer side of the mold ring 14 is a complementary mold plug 15 having a downwardly extending portion carrying external threads for a part of the length thereof corresponding to the threaded section of the ring 14 and terminating in a truncated conical section 16. When the recited elements are assembled the externally threaded portion of the mold plug 15 is located within the mold ring 14 in opposed spaced relation to the internally threaded surface of the mold ring, the outside diameter of the externally threaded portion of the mold plug being sufficiently smaller than the inside diameter of the internally threaded mold ring 14 to provide an annular space or recess corresponding to the predetermined wall thickness of the threaded portion of the finished flange. As shown a vent passage 17 is provided extending axially through the mold plug 15 and the outer end of the conical extension 16 is internally threaded to receive a pipe 22 which better insures against accidental clogging of the vent passage by polyethylene particles during the molding operation. Clamping means, not shown, adapted to cooperate with the embossment 21 on the upper end of mold plug 15, are provided to clamp and hold together the aforesaid elements making up the mold assembly. As shown, the wall thicknesses of the ring 14 and the plug 15 are relatively great as compared with the member 11 to insure adequate heat capacity for promoting the sintering or incipient fusion of the polyethylene powder during the molding operation.

During the molding operation the mold assembly is positioned so that the surface 18 of the mold body is in the upper position, that is to say, in reverse position as compared with its disposition in Fig. 1. After the mold assembly has been brought to a suitable preheat temperature, an excess of polyethylene powder is applied to the mold and pressed with a wiping action against the surface 18 of the mold body and into the annular recess defined between the mold plug 15 and the mold ring 14. The polyethylene powder is pressed with a wiping action along the mold surface and into the mold recess in the manner described hereinabove, to produce a molded polyethylene flange having external and internal threads simultaneously molded thereon. The resulting molded polyethylene outlet flange is indicated at 20.

When the desired internally and externally threaded polyethylene flange has been produced, the clamping means are removed from the mold assembly and the mold plug 15 is unscrewed from the flange. Similarly the mold ring 14 is unscrewed from the molded flange. Thereupon, the base mold section 11 is separated from the molded flange.

Referring now to Figs. 2 and 3 of the drawing, there is illustrated therein a mold assembly suitable for use in molding covers of polyethylene containers, such as a cover for a 50–55 gal. molded polyethylene container or drum, and as a part of the same molding operation, molding flanges of the type indicated in Fig. 1 integrally therein. As shown in these figures a cover mold body 31 is provided with openings 32a and 32b therethrough. These openings which may be the same size or different, as illustrated, are preferably located diametrically opposite each other and relatively close to the outside edge of the cover body mold. Retaining rings 33a and 33b are secured to one side of the cover body mold around and in spaced relation to the openings 32a and 32b, respectively. It is pointed out at this time that the openings 32a and 32b together with the various mold elements associated therewith are dimensioned and proportioned relative to each other so as to produce a vent outlet flange having a relatively small diameter and a pouring or filling flange having a relatively large diameter, respectively. Internally threaded mold rings 34a and 34b are positioned within the retaining rings 33a and 33b, respectively. Supported on the upper end of the threaded mold rings 34a and 34b are mold plugs 35a and 35b, respectively, each partially externally threaded and shaped like the plug 15 of Fig. 1. The threaded portions of the mold plugs are adapted to be positioned within the internally threaded rings 34a and 34b, respectively. Each of the mold plugs 35a and 35b is provided with an opening extending axially therethrough. A clamping bar 36, provided with openings 37a and 37b adapted to receive the cooperating embossments 41a and 41b on the top of plugs 35a and 35b, respectively, is provided to clamp together the elements of the mold assembly. The clamping of the elements of the mold assembly is effected by threaded studs 38a and 38b which are welded to the same side of the cover body mold 31 as the retaining rings 33a and 33b. When the mold elements are assembled as indicated in Fig. 3 of the drawing, the threaded studs 38a and 38b project through openings 39a and 39b in the clamping bar 36. The embossments 41a and 41b extend through the openings 37a and 37b, respectively, and the clamping bar 36 is then pressed against the mold plugs 35a and 35b to hold the mold elements together by means of nuts 40a and 40b which threadedly engage the studs 38a and 38b, respectively.

In the molding of a cover provided with integrally molded polyethylene flanges having external and internal threads simultaneously molded thereon in accordance with the practice of this invention, the mold assembly illustrated in Fig. 3 of the drawing is inverted relative to the position shown in the drawing, and after having been subjected to a suitable preheat treatment, the polyethylene powder is applied with a wiping action onto the surface of the cover mold and into the annular recesses formed between the internally threaded mold rings 34a and 34b, and the mold plugs 35a, 35b respectively. Openings are provided extending through the mold plugs 35a and 35b in the manner indicated in Fig. 1 of the drawing to provide vents so that when the resulting molded polyethylene cover flange indicated at 42 in Fig. 3 and its mold assembly are assembled with an open ended molded polyethylene container and its corresponding mold assembly, the pressure within the assembled molded container remains substantially the same as the pressure outside the container during the operation of welding the mold cover section to the open-ended molded container section.

The mold

The mold elements may be made up of any suitable material which is capable of withstanding temperatures in the range 300–475° F. without any deformation due to heat and which at the same time is relatively highly heat conductive and has a satisfactory heat storing capacity.

The heat conductivity and the heat capacity and mass of the material making up the mold influence the amount of polyethylene which can be softened and sintered and more or less coalesced thereon during a single stage of the powder molding operation; that is, during the period between successive preheating and reheating steps in building up a molded layer or body of polyethylene. Usually a metal mold is preferred. When using a given metal, the thicker the walls of the mold, the more heat will be contained therein and, generally speaking, more of the polyethylene powder can be sintered and built up thereon to form a coating during a given interval between heating steps. At the same time care must be taken not to preheat the mold to such a degree as to cause the polyethylene to decompose. Suitable materials which may be used for the manufacture of the mold elements include iron and steel in various forms, cast iron, stainless steel, metal-clad materials, aluminum, copper, etc. Preferably the molds should be made of a material which is readily separable from the polyethylene molded thereon or to which polyethylene does not tend to strongly adhere.

In order to facilitate the removal of the molded polyethylene article from the mold surface it is desirable to coat the surface of the mold prior to the application of the polyethylene powder thereon with a suitable mold release agent for polyethylene such as a silicone compound in the form of a liquid or grease.

In its presently preferred form, the flange mold of the present invention includes an inner core or plug member 15 of relatively thick section, advantageously made of cast iron, and which has the capability of storing a relatively large amount of heat. The ring member 14 provided with an internally threaded molding surface is made of steel or cast iron and the planar surfaced element 11, whether it be of such shape and extent as to constitute a mold for the lid section of a molded polyethylene container or whether it be of more limited diameter appropriate to the manufacture of the flange as a separate element, may be made of a light steel plate, say 8 to 12 gauge. The mating or seating surfaces of the members 11, 14 and 15 are machined or otherwise finished so as to seat in close fitting engagement with one another when assembled for the molding operation.

The polyethylene powder

The fineness and shape of the particles of the polyethylene powder employed in the manufacture of molded polyethylene flanges in accordance with this invention have an important bearing on the properties of the molded product and also to some extent affect the rate and extent to which the polyethylene powder can be softened and coalesced during each powder molding operation. These factors should be taken into consideration in establishing the operating conditions for the molding operation, especially the conditions as to the preheat temperature of the mold, rate of application of the polyethylene powder to the mold and the degree or extent and manner of application of pressure to the excess polyethylene powder within the mold. For example, it has been found that a mold made from a given material and having a given wall thickness should be brought to a somewhat higher temperature, the greater the average particle size of the polyethylene powder employed. It has also been found that fusion of the polyethylene particles upon the mold surface and the resulting formation of a softened, incipiently fused or sintered coating or layer of polyethylene thereon proceeds more rapidly when the polyethylene particles are generally spherical in shape as compared with polyethylene particles which are more or less triangular and irregular in shape.

The molecular weight of the polyethylene employed in the practice of this invention may vary over a wide range, e. g., 10,000–32,000. Excellent results have been obtained by employing a polyethylene powder having a molecular weight of about 19,000 and a particle size in the range 50–100 mesh. Polyethylene powder having an average particle size of 80 mesh has been found to be most suitable. Another suitable polyethylene powder as supplied by the manufacturer has a molecular weight of approximately 19,000 and a fineness of 100% through a 40 mesh sieve, 85% through a 50 mesh sieve and approximately 50% through an 80 mesh sieve. Still another polyethylene powder having a molecular weight of about 19,000 and a fineness of 90% through a 20 mesh sieve gave satisfactory results.

Preheating the mold

At the commencement of the molding operation, the mold is preheated to a suitably elevated temperature having in mind that it is necessary to insure sintering of the particles of the polyethylene powder thereon and building up of a layer of softened, partly coalesced polyethylene powder on the mold surfaces to an adequate degree during each molding operation, while at the same time avoiding fusion and the running of the fused polyethylene away from the mold surface in contact therewith. Likewise the temperature to which the mold has been preheated should not be such as will cause charring or thermal decomposition of the polyethylene powder pressed or packed thereinto. We have found in actual operation that when the mold is preheated to a temperature in the range 375–450° F., very satisfactory results may be obtained in the ensuing molding step. Somewhat higher or lower preheat temperatures can be employed depending upon the temperature of incipient fusion of the polyethylene employed, the particle size of the polyethylene powder, the wall thickness of the molded polyethylene article to be produced, and the mass and specific heat of the material making up the mold. The mold can usually be brought to the desired preheat temperature by placing it for about 20 to 25 minutes in an oven maintained at the desired preheat temperature.

Although higher preheat temperatures than those above specified may be employed, it has been found that the tendency to cracking of the resulting molded polyethylene article is reduced by operating at a lower temperature consistent with the storing of sufficient heat in the mold to insure a satisfactory build up of the polyethylene layer upon the mold surface during the course of a given step of applying the polyethylene powder to the heated mold surfaces. After the mold has been brought to a convenient and satisfactory preheat temperature, the actual molding of the polyethylene article or packing of the polyethylene powder into the mold is commended.

The molding operation

The manner of application of the polyethylene powder to the mold is extremely important from the standpoint of insuring a satisfactorily molded article. Merely adding or filling the heated mold with a quantity of polyethylene powder calculated to produce the desired molded article and then allowing the mold to cool does not produce a satisfactory result. It is necessary to apply the polyethylene powder to the mold in such a way as positively to insure that the polyethylene particles in immediate contact with the heated mold surface become softened and incipiently fused or sintered on to the surface of the mold to form an adherent coating. Care should be taken that no voids or recesses within the mold are left unfilled and that a firm pressure, preferably with a wiping action, is exerted upon the polyethylene powder added to the mold so that the entire surface of the mold is contacted with the polyethylene powder. In the molding operation particular attention must be given to corners, crevices and threaded surfaces which are presented on the surfaces of the mold so as to insure that the mold is completely filled and that a satisfactory molded article is produced.

Best results are insured when the mold is packed with the polyethlyene powder in such a fashion that a wiping action is exerted upon the surfaces of the mold by the polyethylene particles immediately adjacent and in contact with such surfaces. During the molding operation and the application of pressure upon the polyethylene powder added to the mold, additional polyethylene particles are brought into contact with the initially softened and incipiently fused or sintered polyethylene particles immediately adjacent the surface of the mold under such conditions as to insure a rapid heat transfer to these additional particles so as to bring their temperature to the softening or sintering point with the result that they too become softened and coalesced with and form part of the polyethylene layer initially deposited upon the surfaces of the metal mold.

It is a feature of the invention that the powder molding operation is carried on with a substantial excess of polyethylene particles always present on the surfaces to which the particles are being applied with application of pressure thereto. The provision of an excess of polyethylene particles and the application of the molding pressure to portions of the mass of polyethylene particles that are removed from direct contact with the mold surfaces and which excess particles have not yet been brought to the softened or sintered state, insures that the means used in applying the molding pressure is not brought into contact with the partly softened and sticky particles and thus caused to pick up or accumulate thereon partiatlly fused particles that would lead to shut-downs for clearing of the pressure-applying means, whether it be manually or mechanically operated. The provision of an excess of polyethylene particles also serves to retard the cooling down of the mold and to minimize loss of the stored heat to the atmosphere. In other words, the provision of an excess of polyethylene particles helps to conserve the heat contained in the mold so that it may be usefully employed in building up the molded layer of polyethylene on the mold surfaces. The provision for a superposed layer of as yet unsintered or fused particles above the layer of already coalesced or sintered, or at least partially fused, particles on the mould surfaces also serves to protect the previously fused particles which are adhering to the mold surfaces, against the oxidizing action of the ambient atmosphere during the molding stage when it is desired that the softened or fused particles shall retain to the maximum their properties of fusing and welding together into a homogeneous non-porous layer.

The pressing action, preferably with a wiping motion, is continued as long as the temperature of the previously softened, partially coalesced particles forming a layer on the mold surfaces and the underlying metal surface of the mold remains sufficiently high to cause the added polyethylene particles to become incipiently fused and at least partially coalesced with the underlying layer. When the temperature of the metal surface of the mold and the underlying, softened, partly coalesced layer of polyethylene particles has been reduced to a point where no more appreciable softening of additional polyethylene particles takes place, the excess of the uncoalesced relatively unsoftened polyethylene powder is dusted off or otherwise removed from the mold. It is important that this excess polyethylene powder be removed in order to avoid the formation of bubbles and surface irregularities in the molded polyethylene article during the subsequent reheating and baking operations.

Reheating of the mold

After the layer of the sintered or at least partially fused polyethylene particles has been built up on the mold surfaces to such extent as practical, having regard to the amount of stored heat available in the mold, the mold is then subjected to a suitable heat treatment in an oven or the like in order to fuse the at least partly coalesced polyethylene particles into a uniform, relatively smooth, homogeneous layer. During the reheating operation it is preferred that the mold be so disposed in the oven as to minimize any tendency for the polyethylene to melt and run off the molding surfaces.

The mold should be subjected to this heat treatment for a period of time and at a temperature sufficient to impart to the layer of polyethylene a relatively smooth or glassy appearance. However, the mold, should not be subjected to this heat treatment at temperatures or for a period of time which would cause thermal decomposition of the polyethylene or substantial running or flowing of the polyethylene layer from its originally deposited position on the mold surfaces. During this reheating operation a certain amout of hardening of the polyethylene layer takes place due to the oxidizing action of the furnace atmosphere in the course of the reheating treatment so that any tendency to flow or run is reduced. Satisfactory results are obtained when the mold is kept in an oven for about 14 minutes at a temperature in the range 325–360° F. Higher and lower temperatures as well as shorter and longer periods of heat treatment may be employed depending upon the particular conditions involved.

The heat treatment also serves to restore the heat content of the mold together with the polyethylene deposited thereon so that sufficient heat is made available to bring about the sintering fusion of additional polyethylene powder applied to the mold in a repetition of the previous powder molding step. The above described operations of pressing polyethylene powder into the mold and reheating the mold in order to soften, melt and coalesce the polyethylene deposited therein as a partially coalesced layer, are repeated and continued until no longer any more polyethylene powder can be added to the mold and the desired molded polyethylene article has been produced. After the condition is reached wherein no longer any more polyethylene powder can be pressed and wiped into the mold and the desired molded polyethylene article has been produced, the mold is returned to the oven for a final baking heat treatment preferably carried on within the range 325–360° F. and continued for from 14 to 25 minutes, whereupon the mold and the molded article therein may be air cooled with or without a relatively cold air blast for about 15 minutes or more depending upon the size of the mold and the thickness of the molded polyethylene particle. If desired, a water spray can be applied to the outside surface of the mold. It is pointed out, however, that during the cooling operation those portions of the mold containing relatively thick sections of polyethylene, such as the threaded walls of a polyethylene outlet flange, should be carefully and uniformly cooled in order to insure that the interior portions of the wall section have been cooled to the point where the polyethylene has been reduced to the solid state. The cooling of the molded flange or other article being molded is accompanied by shrinkage and this acts to facilitate the ultimate separation of the article from the mold.

The following is an example of a typical molding operation in which the flange is molded simultaneously with the molding of the lid section of a drum type container, using a lid mold and associated flange mold elements as disclosed in the drawings:

After having previously applied a silicone grease type of releasing agent to the molding surfaces of the mold assembly, the assembly is heated in an oven at a temperature within the range 375–450° F. for 20 minutes. Thereupon the recesses of the flange mold assembly are filled in with polyethylene powder which is pressed firmly down into said recesses, including the threaded surfaces thereof. This is immediately followed by application of a layer of polyethylene powder to the planar surface of the lid portion of the mold assembly accompanied by a wiping action applied through an excess of the polyethylene particles. The mold is then allowed to stand for a few minutes to enable the particles that are in contact with the mold surfaces and have become softened to fuse together under the influence of the heat being given off by the mold. A further application of excess polyethylene powder may then be made, with application of pressure and preferably with a wiping action, to the outer surface of the layer of polyethylene particles so as to force the underlying particles into intimate contact with the previously fused particles and to promote the transfer of heat thereto.

When no more polyethylene powder will become softened and adhere to the underlying fused layer by this method, the excess particles are dusted off and the mold assembly is returned to the oven and reheated until the flange becomes wet in appearance and the whiteness of the polyethylene becomes translucent or crystalline. Usually reheating at 325–360° F. for about 14 minutes will prepare the unit for a further coating treatment. The mold assembly is again withdrawn from the oven and a fresh coating application is made as before. The operations may be repeated for as many additional times as desired depending on the wall thickness required. Usually three coating applications will insure an average wall thickness of the lid section of about 1/16" with the areas about the flange built up to a greater extent.

If the lid section is to be immediately joined to a separately prepared shell section, this may be done by first assembling the lid mold with the shell mold with the peripheral edges of the molded lid section brought into contact with the adjacent annular edge of the molded shell section and with the lid mold and the shell mold drawn together by suitable means. The complete assembly is then reheated together for approximately 22 minutes at 360° F. This will insure welding of the molded lid section to the adjacent end of the shell section. The assembly is then removed from the oven and allowed to cool in air, or if desired the cooling may be accelerated by a water quench. When the resulting molded drum is sufficiently cooled, the flange mold assembly will be disassembled as previously described and thereafter the lid section of the mold is removed and the finished drum may then be separated from the shell mold section.

When the flange mold elements are not of relatively thick section or not made up of a material having a relatively high heat storing capacity, as when the flange mold takes the form shown in our Patent No. 2,736,925, it will be advisable at each molding stage to make an application of the polyethylene powder to the recesses of the flange section of the mold as a separate preliminary operation, then allow the mold to stand for a short interval until the particles packed into the recess have become more or less fused and then to repeat this operation along with and as a part of the complete or overall application of particles to the lid section.

It will be understood that various changes in the details in the structure of the mold and of the flange itself may be made without departing from the spirit and scope of the invention which are not to be deemed as limited otherwise than as indicated by the language of the appended claims.

We claim:

1. A mold assembly suitable for use in molding the cover of a polyethylene container, said cover having a plurality of internally and externally threaded polyethylene outlet flanges which are simultaneously molded therewith, comprising as mold elements a mold body provided with a plurality of openings therethrough, a retaining ring fixed around each of said openings on one side of said mold body and having an inside diameter greater than the diameter of the opening so encircled, an internally threaded mold ring positioned within each of said retaining rings and supported on one end by said mold body, an externally threaded mold plug positioned and extending downwardly within each of said mold rings and supported on the other end of said mold ring within which it is positioned, the outside diameter of the externally threaded portion of each of said mold plugs being smaller tlhan the inside diameter of the internally threaded mold ring within which it is positioned, the externally threaded portion of each of said mold plugs being positioned adjacent the internally threaded portion of the mold ring within which it is inserted, the annular mold recesses defined by the internally threaded surface of each of said mold rings and the externally threaded surface of each of said mold plugs positioned within said mold rings defining the externally and internally threaded walls, respectively, of the polyethylene outlet flanges of the cover to be molded and means for holding the aforesaid mold elements in the above-described positions relative to each other.

2. A mold assembly adapted for powder molding of polyethylene and similar thermoplastic materials into the form of threaded flanges for pouring openings of containers, comprising a mold element provided with an opening therethrough and presenting on one side thereof surrounding said opening an open powder receiving molding surface, a mold member separable from said mold element and having an annular molding surface defining a continuation of said opening and extending from the side of such opening opposite to the side thereof defined by said element molding surface, a second mold member separable from said mold element having an annular molding surface concentrically arranged within and spaced from the molding surface of said first member, and having a part thereof closing the annular opening formed by said element and members at a point spaced from said element molding surface, said element and members forming an open mold cavity communicating at its open end with said element surface, at least one of said members having its molding surface provided with a spiral thread, being rotatable relative to the other member of said element, and being separable from said mold element when rotated relative to a molded flange in said cavity, and means for holding said element and members in cooperative relation during the molding operation.

3. A mold assembly according to claim 2 wherein said second mold member comprises a plug member of relatively massive body section as compared to the wall thickness of said mold element and the body section of said first mold member.

4. A mold assembly suitable for use in molding an internally and externally threaded polyethylene outlet flange for the cover of a polyethylene container, comprising as mold elements a mold body provided with an opening therethrough, a retaining ring fixed around said opening on one side of said mold body and having an inside diameter greater than the diameter of the opening so encircled, an internally threaded mold ring positioned within said retaining ring and supported on one end by said mold body, an externally threaded mold plug positioned and extending downwardly within said mold ring and supported on the other end of said mold ring within which it is positioned, the outside diameter of the externally threaded portion of said mold plug being smaller than the inside diameter of the internally threaded mold ring within which it is positioned, the externally threaded portion of said mold plug being positioned adjacent the internally threaded portion of the mold ring within which it is inserted, the annular mold recess defined by the internally threaded surface of said mold ring and the external threaded surface of said mold plug positioned within said mold ring defining the externally and internally threaded walls, respectively, of the polyethylene outlet flange to be molded, and means for holding the aforesaid mold elements in the above described positions relative to each other.

5. A mold asssembly such as defined in claim 4 in which the means for holding the mold elements in molding position comprises a connecting member secured to said mold body, a member removably connected to said connecting member and to a portion of said mold plug beyond said mold ring, and means detachably securing said connecting members together.

6. A mold assembly according to claim 4 wherein said mold plug is provided with a relatively massive body section as compared with the wall thickness of said mold body and the body section of said mold ring.

References Cited in the file of this patent

UNITED STATES PATENTS

| | | |
|---|---|---|
| 2,133,019 | Campbell | Oct. 11, 1938 |
| 2,133,027 | Honig | Oct. 11, 1938 |
| 2,219,700 | Perrin et al. | Oct. 29, 1940 |
| 2,336,423 | Rieser | Dec. 7, 1943 |
| 2,569,226 | Carter | Sept. 25, 1951 |
| 2,579,952 | Morin | Dec. 25, 1951 |
| 2,654,925 | Ensign et al. | Oct. 13, 1953 |
| 2,736,925 | Heisler et al. | Mar. 6, 1956 |